April 14, 1925.  
D. DAMIANO  
TIDEWATER POWER PLANT  
Filed Nov. 9, 1922

Domenico Damiano  
Inventor

By  
Chertok & Cohen  
Attorneys

April 14, 1925.

D. DAMIANO

TIDEWATER POWER PLANT

Filed Nov. 9, 1922

Domenico Damiano
Inventor

By Chertok & Cohen
Attorneys

Patented Apr. 14, 1925.

1,533,234

UNITED STATES PATENT OFFICE.

DOMENICO DAMIANO, OF BOSTON, MASSACHUSETTS, ASSIGNOR TO DAMIANO TIDE AND STREAM WATER POWER COMPANY, OF BOSTON, MASSACHUSETTS, A VOLUNTARY ORGANIZATION.

TIDEWATER POWER PLANT.

Application filed November 9, 1922. Serial No. 599,865.

*To all whom it may concern:*

Be it known that I, DOMENICO DAMIANO, a subject of the King of Italy, and a resident of Boston, in the county of Suffolk and State of Massachusetts, have invented a new and useful Tidewater Power Plant, of which the following is a specification, reference being had to the accompanying two sheets of drawings, forming part thereof.

My invention relates to a tide water power plant for utilizing the flow and ebb of the tide and has for its object the provision of apparatus for utilizing the flow and ebb of the tide so that the power derived may be substantially constant.

Another object of the invention is to provide a tide motor provided with a float enabling it to follow the level of the water in a well in communication with a tank which receives the water flowing through the turbine.

A further object of the invention is the provision of a plurality of turbines in connection with means enabling a constant generation of power.

Other objects and advantages will be apparent from the following description considered in connection with the accompanying drawings showing an embodiment of the invention in which.

Figure 4:
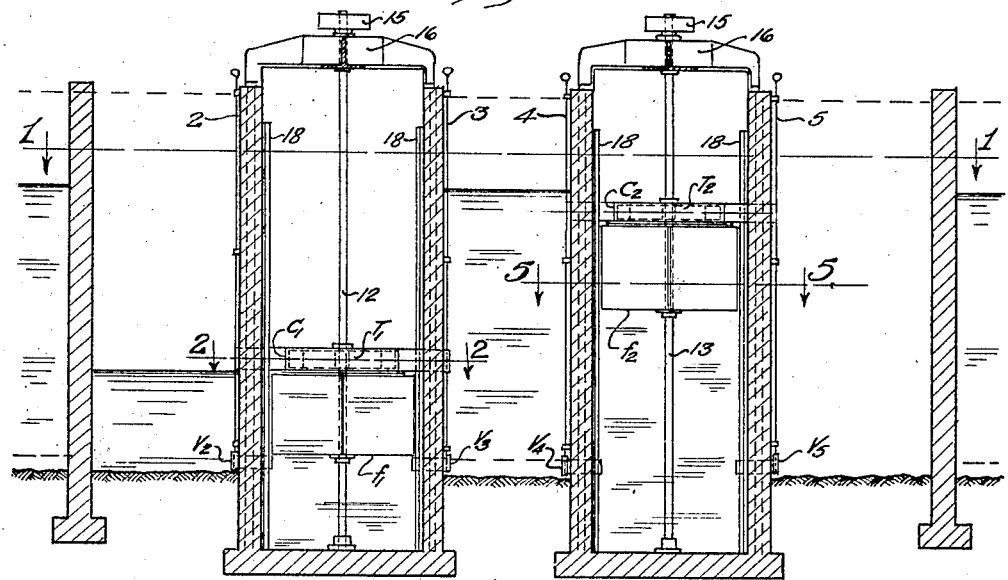
Fig. 4 is a vertical sectional view of the power plant.

The power plant comprises the reservoirs $R_1$ and $R_2$ which are separated from each other by the wall W which may be provided with a suitable valve 1 for controlling communication between the two reservoirs whenever desired. The reservoirs $R_1$ and $R_2$ have associated therewith the turbine wells $W_1$ and $W_2$, respectively, in which are positioned for vertical movement the floats $f_1$ and $f_2$ which support the turbines $T_1$ and $T_2$. The reservoirs $R_1$ and $R_2$ may communicate with the main body of water M through the valves $V_1$ and $V_6$ of any conventional construction. Each turbine well may be placed in communication with its companion reservoir by means of the valves $V_2$ and $V_5$, and with the main body of water M by means of the valves $V_3$ and $V_4$, all of said valves being of any common or preferred form. Means for opening and closing the valves are shown by Fig. 4 and comprise rods 2, 3, 4 and 5.

Figure 1:
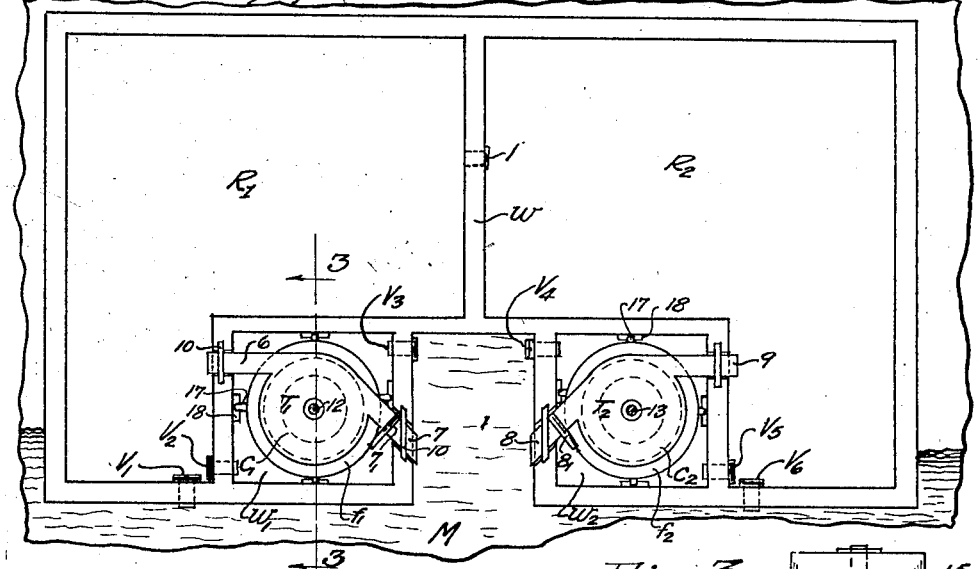
Fig. 1 is a plan sectional view of the tide water power plant on the line 1—1 of Fig. 4.
Figure 2:
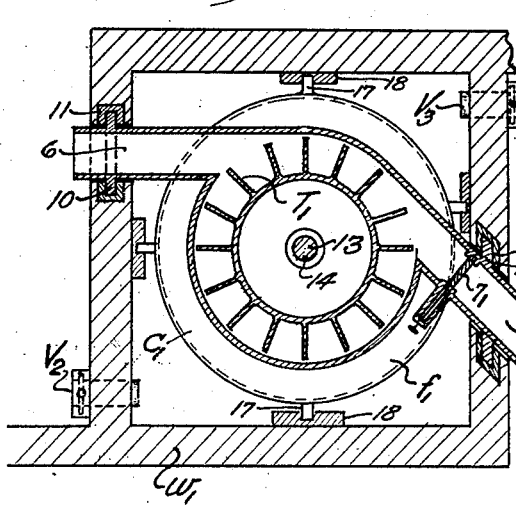
Fig. 2 is a plan sectional view of the motor positioned in the well on the line 2—2 of Fig. 4.
Figure 3:
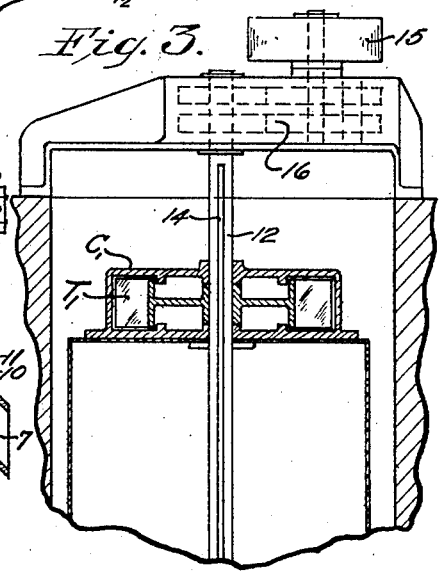
Fig. 3 is a vertical sectional view of the motor and the float on the line 3—3 of Fig. 1.
Figure 5:
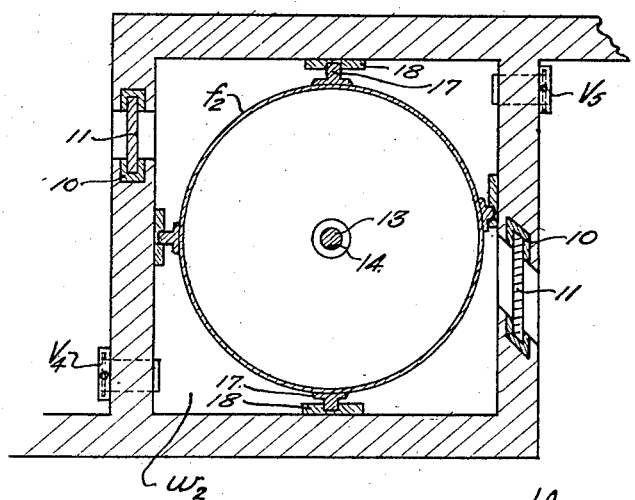
Fig. 5 is a plan sectional view on the line 5—5 of Fig. 4.

The motors $T_1$ and $T_2$ are of the Pelton wheel type and are enclosed in casings $C_1$ and $C_2$ mounted on the floats $f_1$ and $f_2$. The casings $C_1$ and $C_2$ have the conduits 6 and 7, 8 and 9 which pass through the walls of the turbine wells as shown more clearly by Fig. 2. The conduits 6 and 7 engage the sliding gates 10 and 11 which, as it will be clearly understood, thus enables the motor $T_1$ to rise and fall with the level of the water and at the same time maintain communication between the turbine, the main body of water M and the reservoir $R_1$. The conduits 7 and 8 are provided with valves $7_1$ and $8_1$. The conduits 8 and 9 communicate with the main body of water and the reservoir $R_2$ in the same way, as is obvious. The turbines are keyed to the shafts 12 and 13 whereby the power generated is transmitted to any suitable point. Each of the shafts is provided with a key 14 which enables the turbine to move vertically and at the same time rotate the shaft. In order to enable the unidirectional rotation of the power transmission pulley 15 there is provided a direction changing gearing 16 of any well known type not forming part of this invention. It will be understood that as the turbine rises and falls it will at the same time be rotated by the flow of water through the casing in opposite directions but by reason of the provision of the gearing 16, the rotation of the pulley 15 will be in the same direction. As guiding means for the floats $f_1$ and $f_2$, there are provided the projections 17, which may be formed integral with the float, which are received in the ways 18 on the walls of the turbine wells $W_1$ and $W_2$, as shown more clearly by Figs. 2 and 5.

When the tide is about to rise the reservoirs $R_1$ and $R_2$ and the wells $W_1$ and $W_2$ are all empty. The valves $v_3$ and $v_1$ are closed and the valves $7_1$ and $v_2$ are open so that the turbine $T_1$ is actuated as the tide rises by water that flows therethrough into the reservoir $R_1$. The well $W_1$ being in communication with the reservoir $R_1$ through the valve $v_2$ will cause the turbine $T_1$ to assume a position corresponding to the water level in the reservoir $R_1$ and the turbine will rise with the water level. While the tide is rising and actuating turbine $T_1$, the turbine $T_2$ will not be actuated, the valves $8_1$, $v_5$ and $v_6$ being closed and the valve $v_4$ open so that while the turbine will not be actuated it will rise with the tide in the well $W_2$. When turbine $T_1$ stops operating, when the level of the water in reservoir $R_1$ is the same as that of the main body of water M at about three fourths normal high tide, according to the design of the plant, the turbine $T_2$ will be put into operation by opening valves $8_1$ and $v_5$ and closing valve $v_4$. The turbine $T_2$ will operate while the tide is rising to its high level and while the tide is receding to about half its high level. When the tide reaches its high level, valves $7_1$ and $v_3$ are closed so that the water level would be maintained in the reservoir $R_1$ and the turbine $T_1$ would not be actuated during the first part of the fall of the tide while the turbine $T_2$ was operating as just described. As stated, the turbine $T_2$ stops operating when the tide has receded to about half its normal high level and when the level in the reservoir $R_2$ is about the same as that of the main body of water M, as is obvious. At this point, the turbine $T_1$ is again put into operation by opening valves $7_1$ and $v_3$ and closing valve $v_2$ and it will be understood that when turbine $T_2$ stopped operating valves $8_1$ and $v_4$ were closed in order to maintain the head of water in reservoir $R_2$ while the tide was receding. The turbine $T_1$ continues to operate until the tide reaches approximately low level when turbine $T_2$ is again set into operation by opening valve $8_1$ and continues to operate as has turbine $T_1$ until the reservoir is empty and a new cycle of operations is repeated following the steps just described. It is believed that the operation is obvious and that one turbine operates on the rise of the tide until its associated reservoir's water level is the same as that of the main body of water when the other turbine is set into operation and operates while the first turbine is idle until the tide has reached high level and has receded to about half high level when the first turbine operates while the second turbine is idle until low tide is about reached when the second turbine is again operated until its reservoir is empty while in the meantime the reservoir associated with the first turbine has been emptied. It is thus seen that by the operation of the turbines as described a substantially constant supply of power is generated and while the turbines may be operated in other ways, the operation just described is very advantageous because of the constant power supply thereby obtained. It will thus be seen that while both turbines may operate during certain periods in the rise and fall of the tide, there are periods when one turbine only is operating on the rise of the tide and when the other turbine only is operating on the ebb of the tide to thereby effect a substantially constant generation of power.

While I have herein shown and described a specific practical embodiment of my invention, it is to be understood that this showing is merely illustrative of the principles of the invention, and I do not wish to be limited to the exact embodiment herein disclosed except within the scope of the appended claims.

Having thus described my invention, what I claim and desire to secure by Letters Patent of the United States is:

1. A tide water power plant comprising a plurality of reservoirs, a well associated with each of said reservoirs, means controlling communications between each well and its companion reservoir, a float controlled motor in each well, means for actuating one of said motors during the rise of the tide, means for actuating one of said motors during the fall of the tide, and means for actuating said first mentioned motor subsequent to the actuation of said second mentioned motor during the fall of the tide, both of said reservoirs being filled and emptied by water flowing through said turbines during the actuation thereof.

2. A tide water power plant comprising a plurality of reservoirs, a well associated with each of said reservoirs, means controlling communications between said reservoirs and said wells, a float controlled motor in each of said wells, means controlling communication between said wells and a body of tide water, and means controlling communication from the tide water to the reservoir through said motor, both of said reservoirs being filled and emptied by water flowing through said turbines during the actuation thereof.

In testimony whereof, I hereunto affix my signature this seventh day of November, 1922.

DOMENICO DAMIANO.